Aug. 17, 1965    RYOJI YUMOTO    3,201,280
LEAD-ACID STORAGE BATTERY
Filed Oct. 7, 1960    2 Sheets-Sheet 1

INVENTOR
Ryoji Yumoto
By
Watson, Cole, Grindle & Watson
ATTORNEYS

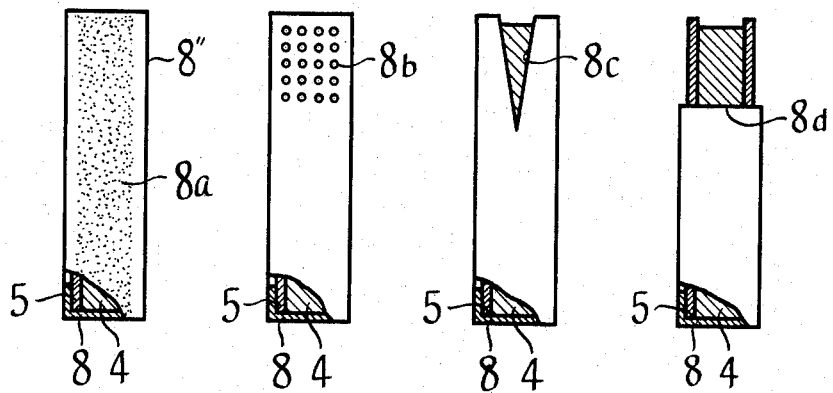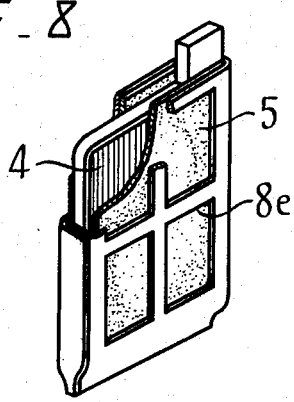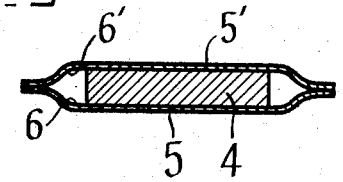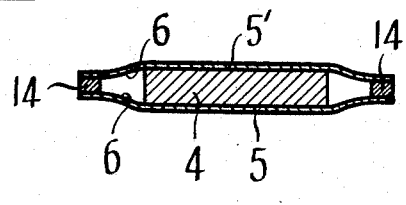

— Patent text —

3,201,280
LEAD-ACID STORAGE BATTERY
Ryoji Yumoto, No. 1 of 402 Akutagawa,
Takatsuki, Japan
Filed Oct. 7, 1960, Ser. No. 61,234
Claims priority, application Japan, Jan. 14, 1960,
35/1,147
6 Claims. (Cl. 136—26)

This invention relates to a lead-acid storage battery designed to be extremely small in dimensional size.

Conventional lead-acid storage battery is so constructed that it has ridges on the bottom of the cell, and positive or negative plates groups are placed on them so that, even though the active material being shed out from the plates accumulates at the bottom of cell, short-circuits of positive and negative plates are prevented. The height of ridges that makes clearance for sediment accumulation occupies usually 6–30% of battery's total height. A battery in which ridges are only as high as about 6% has very large possibility to be defective with short-circuits.

In the field of portable communications equipments, the battery as its supply source is nowadays required to be designed smaller and smaller in size and weight, hence tending to have lower ridges that is resulted in smaller sediment space at the bottom of cell. This has become a cause of shortening the battery's service life because even by a little volume of sediment, short-circuits take place before the plates end the life.

In order to solve this problem, a widely known method to accommodate positive or negative plates into a kind of square pocket made of porous separator has been suggested. However, this is not practically utilized because of difficulties in making the pocket. The porous separator is inferior in mechanical strength because the separator itself is largely porous to be low in electrical resistance and solid to be acid-resistant. Subsequently, the corner portions of the pocket tend to easily break off due to shocks from inside and outside of the battery, and therefore sufficient effects in preventing short-circuits cannot be expected.

The first object of this invention is to prevent short-circuits caused by the shed-out material, and to prolong the battery's service life.

The second object of this invention is to make small the overall size of battery and light the weight by means of using a battery container having no ridges, in which the plate groups are placed directly at its bottom surface.

The third object of this invention is to design the battery for easy manufacturing so that a cost minimization can be expected. Each part of the battery of this invention is explained in the attached drawing.

FIGS. 4 to 10 show various modifications of the enclosed plates assembly. Among them, FIGS. 4 to 7 are the side-view of the assembly partially cut-away; FIG. 8 is a perspective view of same; and FIGS. 9 and 10 are the plane.

Figure 1:
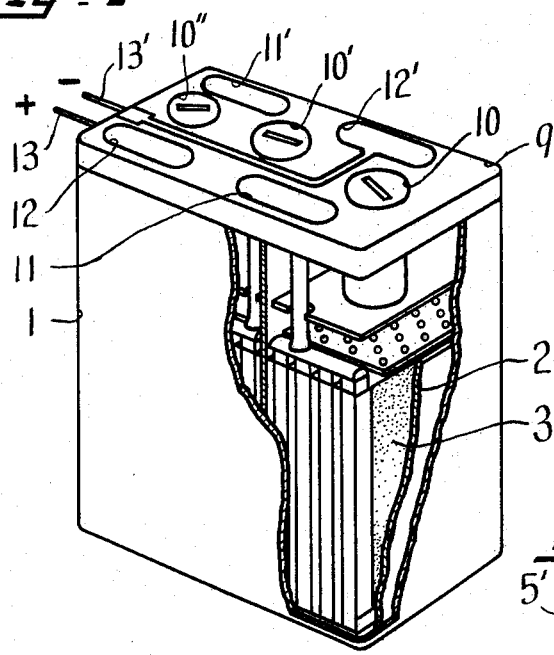
FIG. 1 is a perspective view of a battery partially cut away to show the plates therein.
Figure 2:
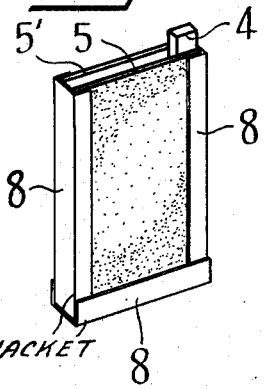
FIG. 2 is a perspective view of an enclosed plate assembly.
Figure 3:
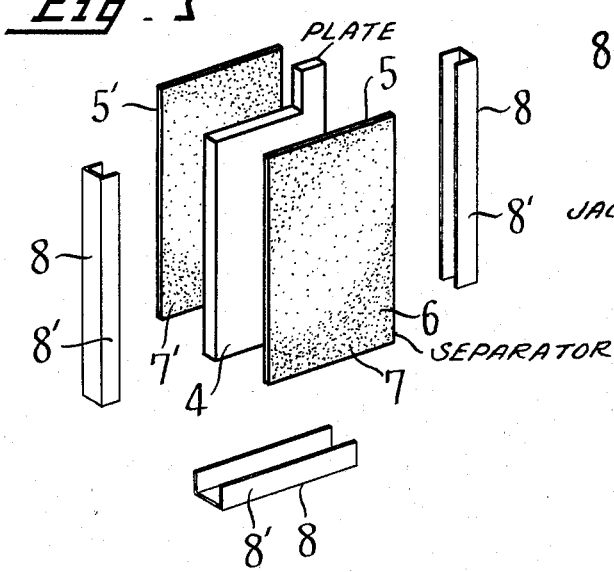
FIG. 3 shows the parts of plate assembly in a dismantled state.

In FIG. 1, 1 is the container having no ridges at its bottom, which is made of a material of acid-proof and electrically insulating, and comparatively light in weight. For instance it may be made with a synthetic resin like styrol. This container having no ridges is one of the distinctive characteristics of this invention as it makes the battery small in size, light in weight and low in cost. 2 is the negative plate. 3 is the enclosed plate assembly that consists another superiority of this battery. As shown in FIGS. 2 and 3, it is so constructed that the positive plate 4 is wrapped with two adjacent microporous rubber separators 5, 5' which are covered at the both sides 6, 6' and bottom 7, 7' with jackets 8 thus making the plate totally enclosed or enveloped. The jacket 8 is a thin plate made of a material of acid-proof and electrically insulating and hardly breakable being large in mechanical strength. For instance, it may suitably be a non-porous thin plate made of synthetic resin like polyethylene, polyvinyl chloride or polyesters. It is further preferably that the jacket 8 has a cross section of U shape. As shown in FIG. 3, the enclosed plate assembly 3 is completed in such a manner that the bent portions 8' of the jacket 8 are joined adhesively to the both sides 6, 6' and bottom 7, 7' of the separators 5, 5'. Imperfect processing of the above parts' joining must be avoided in manufacturing, otherwise minute particles of active materials may escape from the joining portion or the jackets 8 or they may fall off the separators. Heat adhesion is recommended suitable in case a polystyrene jacket is used. When polyvinyl chloride is used for jackets, an adhesive agent made of polyvinyl chloride of which small amount is dissolved by cyclohexanone may preferably be used.

In storage batteries in which the plates and separators are assembled with glassfiber mats, hence the plate groups being tightly pressed in the container, the adhesive agent used on the jacket may be only in partial depositing.

And then the enclosed plate assemblies 3 made in the above method are in well known art assembled into plate groups when they are alternately arranged with negative plates. The plate groups are encased in a container 1 having no ridges at its bottom. It is preferably that the plate groups are put into the container 1 being pressed tightly by the container walls. After the cover 9 is placed on the container for sealing, the battery is assembled to a complete form by ordinarily adopted method.

In the storage battery of this invention, however, a construction is adopted so that the upper surfaces of the vent plugs 10, 10', 10", connectors 11, 11' and terminals 12, 12' do not come higher than that of the cover 9. The positive and negative lead-wires 13, 13' are taken out at one side of the cover 9. These constructional considerations have made possible the battery's total dimensions smaller.

FIGS. 4 to 7 are the modifications of this invention. The purpose of the modifications is to have better access or circulation of the electrolyte to the positive plate 4 enclosed in the enclosed plate assembly 3. It is done by means of providing to the jacket itself pores or exposed portions. FIG. 4 shows one of the forms to provide to the jacket 8a micro-pores of the size as large as they allow electrolyte to run through them but not for shed-out materials. In practicing this method, however, it is recommended to make the jacket 8a to have margin 8" where no pores are provided in order not to decrease mechanical strength. FIG. 5 shows another method of the modifications in which the jacket 8b is perforated at its upper portion, and the jacket 8c in FIG. 6 is partially cut away in V shape, and in FIG. 7 the upper part of the jacket 8d is cut away to make plate exposed.

It is important that these constructional provisions should be made only in upper part of the jacket except for FIG. 4. The reason is that even though the fine particles of active materials sheds out from the plate and makes accumulation down at the bottom, it is only the occurrence inside the envelope, subsequently it does not cause possibilities of short-circuits. The each modification works to produce comparatively better access or circulation of electrolyte; to prevent ununiformity of acid density; to contribute to the elimination of gas-generation and to better maintaining of battery capacity.

FIGS. 8, 9 and 10 are other modifications of this invention. In FIG. 8, jacket 8 is replaced with a frame 8e which has far larger mechanical strength to withstand severe shocks. FIG. 9 shows a method in which no jacket is used at all. In this case, two micro-porous rubber separators are affixed with adhesive agent at its both sides 6, 6' in FIG. 3 and its bottom 7, 7' in FIG. 3. In this construction, the micro-porous rubber separators are severely bent at the both sides and bottom. In order to prevent any breakage or cracks that may occur in the bent portions, rods 14 in FIG. 10 may be used to join the two separators.

These explanations make clear that the storage battery of this invention is extremely small in weight and cubage against a certain amount of capacity.

While I have herein shown and described preferred embodiments of my invention, it is contemplated that departures from this disclosure may be within the spirit and scope of the invention. For example, the enclosed plate assembly 3 may also be used for negative plates instead of positive plates as above explained, or the pieces of jackets used may be made in one unit having U-shape cross section.

What I claim is:

1. A lead-acid storage battery comprising a container having a substantially flat interior bottom surface upon which the battery plates are rested, electrolyte in said container, a pair of plates in said container, one of said plates having a pair of micro-porous separators on the opposite surfaces thereof, a jacket of acid-resistant electrically insulating material overlapping the side and bottom edges of said separators to define with said separators an enclosure for said one plate whereby said one plate is enclosed to prevent sedimentation from seeping out and short circuiting the plates resting on said bottom.

2. A battery according to claim 1 wherein said jackets are of non-porous material.

3. A battery according to claim 1 wherein said jackets are of microporous material.

4. A battery according to claim 1 wherein the upper portion of said separators have at least one aperture therein for improved saturation of the separator by the electrolyte.

5. A battery according to claim 1 wherein said jacket is formed in a unit to enclose at least three edges of said separators.

6. A lead-acid storage battery comprising a container having a substantially flat interior bottom surface upon which the bottom plates are rested, electrolyte in said container, a pair of substantially flat electrodes supported by said surface and a pair of microporous separators contiguous the surfaces of one of said electrodes, the bottom and the side edges of said separators being joined to substantially enclose said one electrode, to thereby prevent sedimentation on said bottom surface, and wherein said container includes a cover having vent plugs therein, which vent plugs are substantially flush with said cover and wherein lead-in wires are connected to said electrodes and project from the side of the cover.

References Cited by the Examiner

UNITED STATES PATENTS

| 1,668,404 | 5/28 | Hollen | 136—147 |
| 1,942,350 | 1/34 | Appel et al. | 136—134 |
| 2,490,630 | 12/49 | Jardine | 136—147.2 |
| 2,905,738 | 9/59 | Pasquale et al. | 136—6 |
| 2,934,585 | 4/60 | Zahn | 136—147 |

FOREIGN PATENTS

| 285,226 | 2/28 | Great Britain. |

WINSTON A. DOUGLAS, *Primary Examiner.*

JOHN R. SPECK, MURRAY TILLMAN, JOHN H. MACK, *Examiners.*